United States Patent

[11] 3,542,383

| [72] | Inventors | James L. Farley;<br>Eugene R. Martin, East Peoria; Ira H. Sage, Peoria, Illinois |
|---|---|---|
| [21] | Appl. No. | 763,900 |
| [22] | Filed | Sept. 30, 1968 |
| [45] | Patented | Nov. 24, 1970 |
| [73] | Assignee | Caterpillar Tractor Co.<br>Peoria, Illinois<br>a corporation of California |

[54] DUAL CHUCK ASSEMBLY FOR INERTIA WELDING
3 Claims, 3 Drawing Figs.

| [52] | U.S. Cl. | 279/2 |
|---|---|---|
| [51] | Int. Cl. | B23b 31/40 |
| [50] | Field of Search | 279/1(S), 1(DC), 1DA, 2; 269/48.1 |

[56] References Cited
UNITED STATES PATENTS
2,394,841  2/1946  Bugg ........................... 279/1(DA)UX Primary Examiner—Andrew R. Juhasz
Assistant Examiner—Donald D. Evenson
Attorney—Fryer, Tjensvold, Feix, Phillips & Lempio ABSTRACT: A chuck assembly for securing a tubular workpiece in an inertia welding machine comprising a restrictable outer chuck and an expandable inner chuck. To avoid distortion of the workpiece and to prevent it from buckling, twisting or collapsing during the welding process, initial clamping force is predominantly applied by the inner chuck while clamping force of the outer chuck is increased in response to interaction of the workpieces.

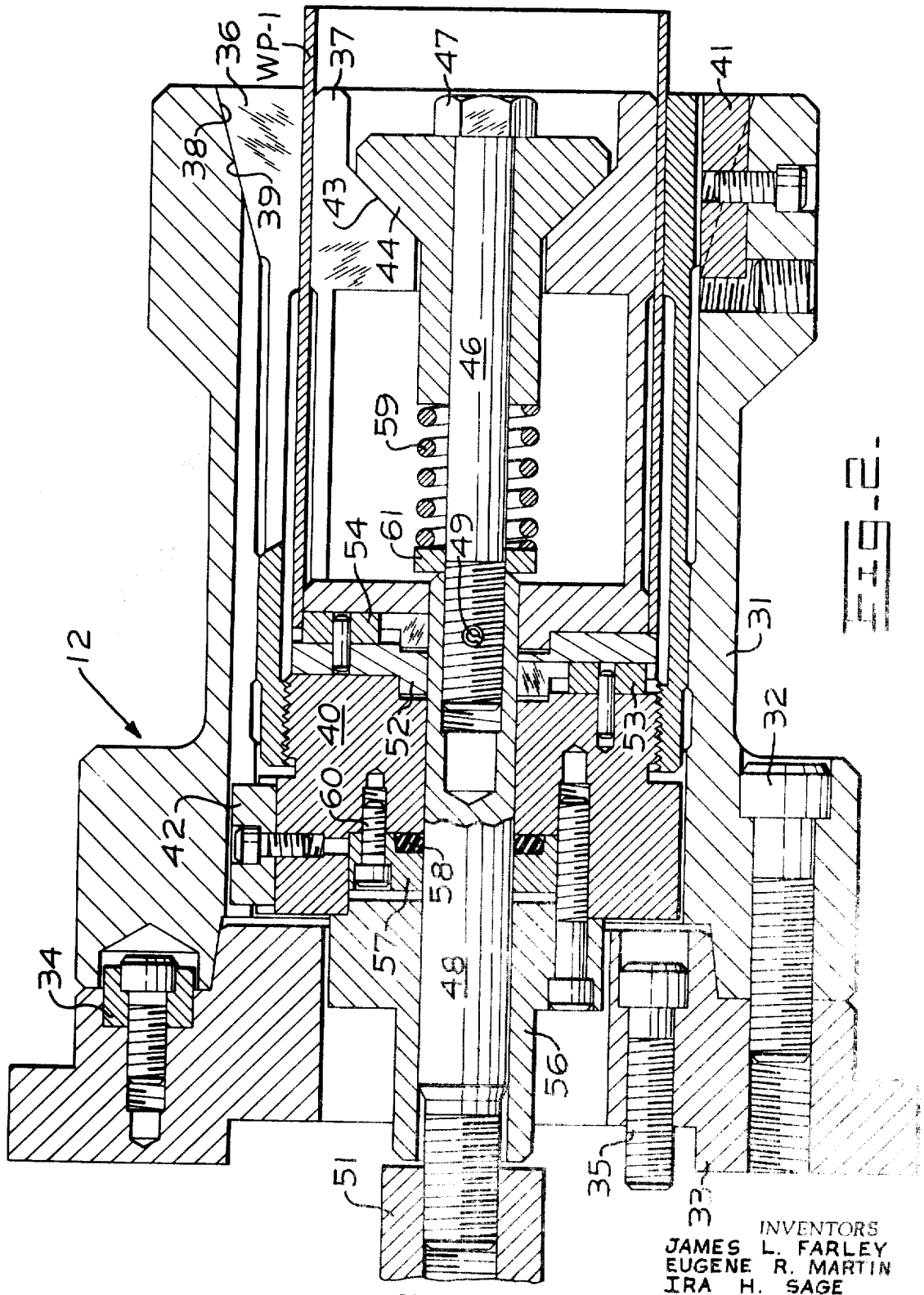

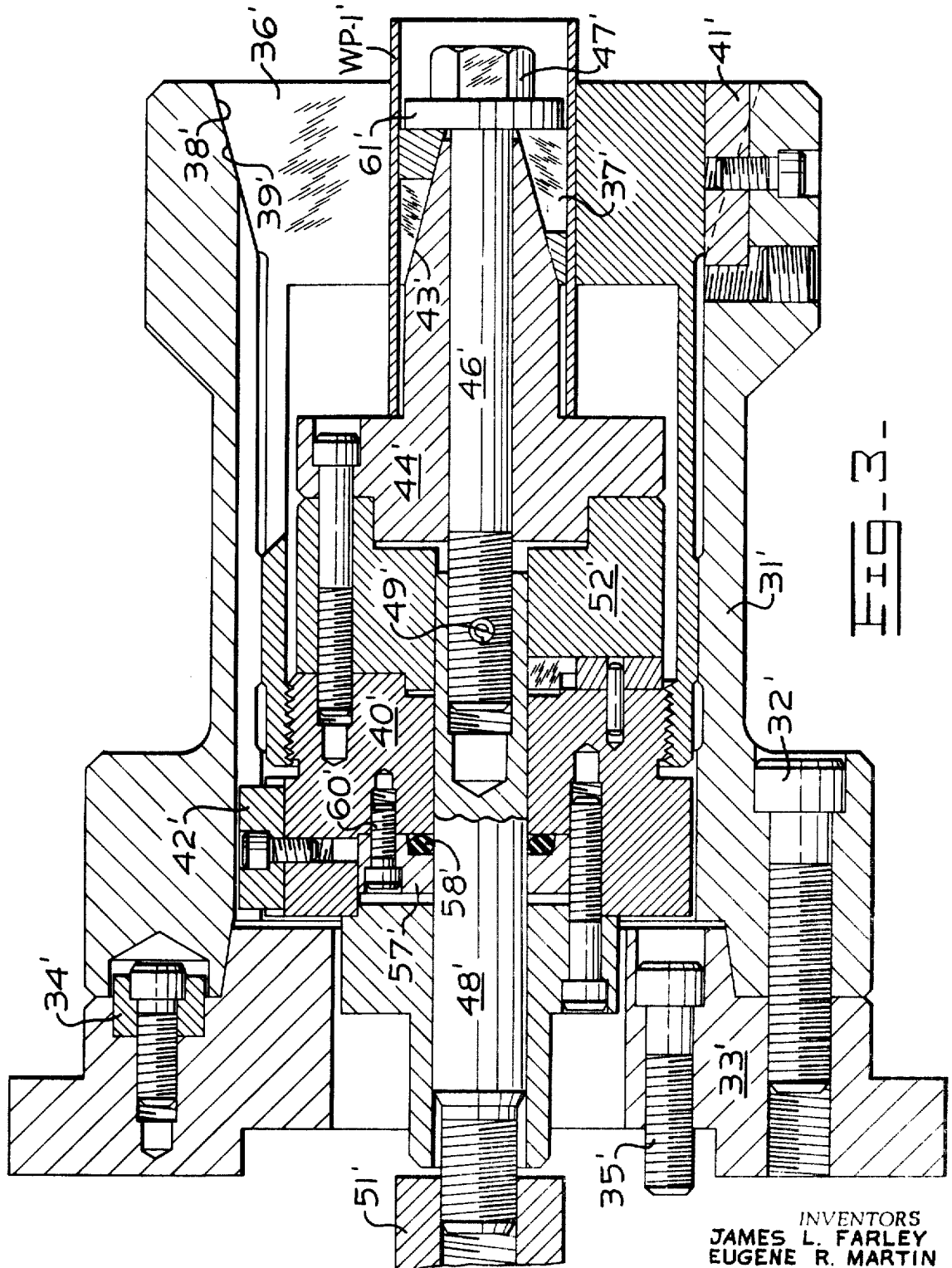

DUAL CHUCK ASSEMBLY FOR INERTIA WELDING

The present invention relates to a chuck assembly and more particularly a chuck assembly for securing a tubular workpiece in an inertia welding machine. Increased clamping of the workpiece accomplished through the combination of a restrictable outer chuck and an expandable inner chuck which are selectively operable to prevent distortion in the workpiece and to support and secure the workpiece during the welding process.

The use of a single expandable or collapsible chuck in combination with a fixed backup member has been found to achieve sometimes unsatisfactory results during friction welding of tubular workpieces. The chuck assembly must secure the workpiece during its interaction with another relatively rotating workpiece under very large axial forces. The problems encountered with chuck operation are particularly noticeable when one of the workpieces is of relatively thin wall tubing. The chuck must initially secure the workpiece without dimensionally distorting the workpiece. The tubular workpiece must also be protected from forces tending to cause buckling, twisting and collapsing, for example, under the substantial interacting forces of the welding process. Relative rotating interaction of the workpieces during the actual welding steps may also cause slippage of the workpieces in their respective chucks. Such slippage is detrimental since it may interfere with precisely desired welding parameters or else be a further source of distortion or damage to the workpiece.

Accordingly it is an object of the invention to provide a chuck assembly having inner and outer chucks for securing a workpiece.

It is a further object to apply initial clamping force to the workpiece through the inner chuck in order to maintain dimensional stability of the tubular workpiece.

It is another object to make the chuck assembly responsive to welding thrust pressure between two workpieces to further increase clamping forces on the one workpiece.

It is also an object to provide an improved chuck assembly for securing thin walled tubular workpieces in inertia welding machines.

Other objects and advantages of the invention are made apparent in the following description having reference to the accompanying drawings.

In the drawings:

FIG. 2 is a sectioned longitudinal view of a chuck assembly for use in the machine of FIG. 1 and constructed according to the present invention; and FIG. 3 is a view similar to FIG. 2 and illustrates an alternate embodiment of a chuck assembly according to the present invention.

Figure 1:
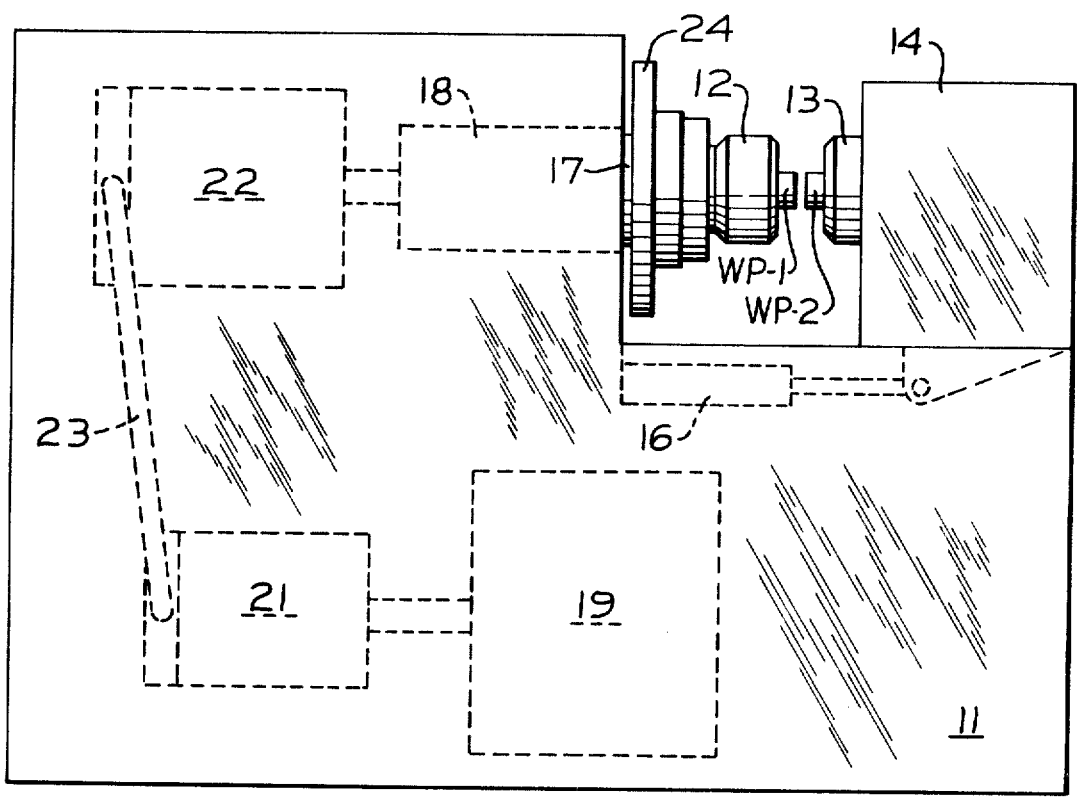
FIG. 1 is a side elevational view, in diagrammatic form, of an inertia welding machine.

A friction welding machine is illustrated in FIG. 1 as an exemplary setting for the chuck assembly of the present invention. The machine has a frame 11 with two parts to be welded, workpieces WP-1 and WP-2, mounted respectively within chucks 12 and 13. The tailstock chuck 13 is secured against rotation upon a fixture assembly 14. The fixture 14 is mounted for axial motion on the machine frame under the control of a load cylinder 16. A pressure control circuit (not shown) regulates the pressure in the load cylinder, and thus determines the force with which the parts WP-1 and WP-2 are engaged. The chuck 12 is secured to a spindle 17 which is supported for rotation in a bearing assembly 18. An electric motor 19 rotates the spindle 17 through a hydrostatic transmission which includes a hydraulic pump 21, a hydraulic motor 22 and a manifold 23 between the pump and the motor. One or more inertial weights 24 are mounted on the spindle in accordance with conventional inertia welding techniques.

The present invention is particularly concerned with one of the chuck assemblies, for example the chuck 12, and its construction for securing the workpiece WP-1 where the workpiece is of tubular form.

Referring now to FIG. 2, the chuck assembly 12 includes a chuck body 31 secured by capscrews 32 to a spindle nose 33 which is mounted upon the spindle 17 (see FIG. 1) by capscrews, one of which is indicated at 35. A drive key 34 is secured to the spindle nose 33 and interlocks with the chuck body 31 to insure rotation of the chuck assembly with the spindle. According to the present invention, the chuck assembly includes an outer chuck 36 and an inner chuck 37 which are supported within the chuck body 31 in generally spaced apart concentric relation to receive the workpiece WP-1.

The outer chuck 36 includes a split collet sleeve which is threaded onto an actuator block 40 disposed inside of the chuck body 31. The chuck sleeve 36 has an externally tapered portion 38 which generally mates with a tapered surface 39 formed at the end of the chuck body 31. The tapered surfaces 38 and 39 interact as the chuck sleeve 36 is moved leftwardly into the chuck body 31 so that the chuck sleeve 36 is restricted or collapsed slightly in order to clamp onto the workpiece WP-1. A plurality of keys, one of which is indicated at 41, are secured to the chuck body 31 and interlocked with the chuck sleeve 36 to prevent it from rotating relative to the chuck body 31. Similar keys 42 are secured to the actuator block 40 and interlock with the chuck body 31 to prevent relative rotation between those portions of the chuck assembly.

The outer chuck 36 may be employed by itself for use with generally solid workpieces. However, the present invention contemplates its use particularly in conjunction with the inner chuck 37 for supporting the tubular workpiece WP-1. The inner chuck 37 is also a split collet and has an internally tapered surface 43 associated with a tapered mandrel or expander 44. The mandrel 44 is capable of interacting with the inner chuck 37 causing it to expand and clamp against the workpiece WP-1. To shift the mandrel against the inner chuck 37, it is secured to a pin or bolt 46 by stop means comprising the head 47 of the bolt 46. The bolt 46 is threaded into an actuator shaft 48 and secured in place by means of a pin 49. The actuator shaft 48 is in turn secured to the rod of a hydraulic clamping cylinder, with the rod being shown partially at 51. The inner chuck sleeve 37 is secured to an adapter plate 52 which is in turn secured to the actuator block 40 with a key 53 preventing relative rotation between the actuator block and the adapter plate. Another key 54 prevents relative rotation between the inner chuck sleeve 37 and the adapter plate 52. A spacer block 56 is secured to the rear of the actuator block 40 and abuts the cylinder rod 51 to assist in releasing the workpiece from the chuck assembly in a manner described below. An adapter plate 57 is also secured to the rear of the actuator block 40 adjacent the spacer block 56 with a seal ring 58 being arranged between the actuator block and adapter plate 57. As the adapter plate is secured to the actuator block by tightening of screws 60, the seal ring 58 is compressed and acts as a lock between the shaft 48 and the actuator block 40 so that when the chuck assembly is removed from the spindle nose 33, the internal parts of the chuck assembly are retained in place. A spring 59 is arranged for interaction between the mandrel 44 and a washer 61 which abuts the actuator shaft 48. The spring 59 also assists in releasing the workpiece from the chuck assembly as described below.

In operation during a typical weld cycle, the workpiece WP-1 is inserted into the chuck assembly between the outer chuck 36 and the inner chuck 37. The chucking cylinder rod 51 is retracted (leftwardly as shown in FIG. 2). The mandrel 44 is accordingly urged further into the chuck assembly by the actuator bolt 46 and causes expansion of the inner chuck sleeve 37. During this operation, the spring 59 is compressed between the mandrel 44 and the washer 61 as it comes in contact with the inner chuck 37.

As the inner chuck sleeve 37 makes contact with the workpiece WP-1, axial force applied by the clamping cylinder is transferred through the inner sleeve 37 to the actuator block 40. The actuator block is then also moved leftwardly and draws the outer chuck sleeve 36 further into the chuck body 31. Interaction of the tapered surfaces 38 and 39 causes the outer chuck sleeve 36 to be restricted or collapsed upon the workpiece WP-1 so that the workpiece is secured in place during the entire welding operation by a constant force applied through the chucking cylinder. Since the internal chuck sleeve 37 first contacts the workpiece WP-1, clamping force during this initial stage is predominantly applied by the inner chuck while the outer chuck sleeve 36 tends to serve as backup member. Predominant clamping by the inner chuck 37 also tends to prevent the outer chuck 36 from collapsing or dimensionally distorting the workpiece WP-1. As the workpieces WP-1 and WP-2 are brought into axial engagement during the welding portion of the cycle, the workpiece WP-1 and the chuck assembly 12 are rotating together with the spindle 17 (see FIG. 1). Axial thrust applied by the workpiece WP-2 against the workpiece WP-1 is transferred to the backup plate 52 and then into the actuator block 40. Since the outer chuck sleeve 36 is secured to the actuator block 40, additional force is accordingly applied to collapse the outer sleeve 36 upon the workpiece and exert still greater clamping force upon the workpiece WP-1. Since this axial force is much greater than the force applied through the clamping cylinder rod 51, the outer chuck sleeve 36 applied predominant clamping force during this period While the inner chuck sleeve 37 tends to become a backup member. The additional clamping force applied in this manner tends to prevent relative rotation of the workpiece WP-1 within the chuck assembly and avoid distortion or damage to the workpiece while it is experiencing substantial forces of interaction with the other workpiece WP-2.

Upon completion of the weld, the clamping cylinder rod 51 is shifted rightwardly, extending the actuator shaft 48 rightwardly and moving the bolt head 47 out of engagement with the mandrel 44. At the same time, the cylinder rod 51 contacts the spacer block 56 and urges the actuator block 40, the adapter plate 52 and the outer and inner chucks 36 and 37 rightwardly so that the workpiece tends to be first released by the outer chuck 36. The compressed spring 59 tends to free the mandrel 44 from the inner chuck and permits disassembly of the workpiece WP-1 from the chuck assembly.

Referring to FIG. 3, an alternate embodiment of the chuck assembly 12 is illustrated being generally similar to that shown in FIG. 2. The inner and outer chucks are illustrated for preferable adaptation to a thin walled tubular workpiece having a small diameter but could also be employed for larger diameter workpieces. Components in FIG. 3 which are similar to those in FIG. 2 are indicated by primed numerals. The outer chuck sleeve 36' extends radially inwardly to contact the small diameter of the workpiece WP-1'. The inner chuck sleeve 36' and its associated components are of different and somewhat simplified construction compared to the embodiment of FIG. 2. The mandrel 44' is secured to the backup plate 52' which is mounted upon the actuator block 40'. The inner chuck or split collet sleeve 37' is not secured to the actuator block. However the bolt 46' extends from the actuator shaft 48' through the mandrel 44' with its head or stop means 47' acting upon the inner chuck 37' by means of a washer 61'. The tapered mating surfaces of the mandrel 44' and the inner chuck 37' are also reversed from the configuration shown in FIG. 2 so that leftward shifting of the actuator shaft 48' similarly causes the inner chuck sleeve 37' to be expanded by interaction with the mandrel 44'. In other respects, the manner of clamping operation for the inner chuck 37' and the outer chuck 36' are similar to the above description relative to FIG. 2.

We claim:

1. A collet chuck assembly for use in a friction welding machine, the collet chuck assembly for receiving and securing a tabular workpiece which is then set in relative rotation with another workpiece, the two workpieces being urged into axial engagement at a common interface under substantial axial pressure loading to accomplish a bond between the two workpieces at their interface, the collet chuck assembly comprising:

a chuck body;
   an outer restrictable chuck mounted on the chuck body;
   an inner expandable chuck mounted on the chuck body in generally concentric spaced apart relation with the outer chuck for receiving the tubular work piece between the two chucks;
   means for selectively clamping both the inner and outer chucks upon the tubular workpiece to secure the workpiece and prevent buckling, twisting and collapsing of the workpiece, the clamping means being initially operable after reception of the workpiece for primarily exerting clamping force on the workpiece by means of the inner chuck while the outer chuck is restricted sufficiently to serve as a backup member to resist distortion of the tubular workpiece by the inner chuck, and
   an actuator block coupled with the outer chuck and arranged for axial engagement with the tubular workpiece so that axial movement of the tubular workpiece upon engagement with the other workpiece, tends to further restrict the outer chuck upon the tubular workpiece with the inner chuck then acting as a backup member.

2. The collet chuck assembly of claim 1 wherein the inner chuck is removable from the chuck assembly to permit employment of the chuck assembly with solid workpieces.

3. A collet chuck assembly for receiving and securing a tubular workpiece in a friction welding machine, comprising:

a chuck body;
   an outer restrictable chuck mounted on the chuck body;
   an inner expandable chuck mounted on the chuck body in generally concentric spaced apart relation with the outer chuck for receiving the tubular workpiece between the two chucks, the inner chuck being of split construction and being formed with an inner tapered surface;
   means effectively coupled with both chucks for selectively clamping both the inner and outer chucks upon the tubular workpiece to secure the workpiece and prevent buckling, twisting and collapsing of the workpiece, the clamping means comprising an axially movable mandrel having an outer tapered surface generally mating with the tapered surface of the inner chuck for urging the split inner chuck against the one workpiece, the clamping means being initially operable after reception of the workpiece for primarily exerting clamping force on the workpiece by means of the inner chuck while the outer chuck is restricted sufficiently to serve as a backup member to resist distortion of the workpiece by the inner chuck;
   the mandrel and inner chuck being coupled with drawbar means of the friction welding machine, the drawbar means being operable for relatively shifting the mandrel and inner chuck and urging the inner chuck against the one workpiece, the drawbar means being secured to a shaft which penetrates the mandrel and has stop means at its penetrating end for acting against the mandrel, a spring being arranged for interaction between the drawbar means and mandrel to assist in releasing the inner chuck from the one workpiece;
   the outer chuck being secured to an actuator block arranged for receiving an end of the workpiece within the chuck assembly; and
   means for maintaining the inner chuck and outer chuck in generally radial alignment with each other.